(12) United States Patent
Oto

(10) Patent No.: US 7,213,879 B2
(45) Date of Patent: May 8, 2007

(54) STORABLE SEAT

(76) Inventor: Noriyuki Oto, 23 Rue des Bergeres, 91940 Les Ulis (FR)

( * ) Notice: Subject to any disclaimer, the term of this patent is extended or adjusted under 35 U.S.C. 154(b) by 372 days.

(21) Appl. No.: 10/492,744

(22) PCT Filed: Oct. 17, 2002

(86) PCT No.: PCT/JP02/10791

§ 371 (c)(1),
(2), (4) Date: Nov. 4, 2004

(87) PCT Pub. No.: WO03/033295

PCT Pub. Date: Apr. 24, 2003

(65) Prior Publication Data

US 2005/0052059 A1   Mar. 10, 2005

(30) Foreign Application Priority Data

Oct. 17, 2001   (JP) ............................. 2001-319073

(51) Int. Cl.
*A47C 15/00*   (2006.01)
(52) U.S. Cl. ...................................... 297/238; 297/255
(58) Field of Classification Search ................ 297/238, 297/255, 256.16, 188.04, 188.07
See application file for complete search history.

(56) References Cited

U.S. PATENT DOCUMENTS

| | | | | |
|---|---|---|---|---|
| 5,385,384 A | * | 1/1995 | Gierman et al. ............ 297/238 |
| 5,498,062 A | * | 3/1996 | Holdampf ................... 297/238 |
| 5,568,959 A | * | 10/1996 | Weber et al. ............... 297/238 |
| 5,639,144 A | * | 6/1997 | Naujokas .................... 297/238 |
| 5,662,377 A | * | 9/1997 | Holdampf et al. .......... 297/238 |
| 6,048,027 A | * | 4/2000 | Peck et al. .................. 297/238 |
| 6,302,484 B1 | * | 10/2001 | Araki et al. ........... 297/378.12 |

* cited by examiner

*Primary Examiner*—David R. Dunn
*Assistant Examiner*—Tania Abraham

(57) ABSTRACT

The stowage type seat 1 is built into the rear seat of an automobile, and is constructed from a seat cushion 2 that supports the hips of the passenger, a seat back 3 that supports the back of the passenger, and a safety bone 4 that acts to absorb impact and ensure strength in the case of severe impacts from the rear. The seat back 3 is constructed from a fixed remaining-part shell 11 and an opening-and-closing part shell 12 that can open and close on the side of the seat cushion 2. Both of these shells are connected via a connecting rod that passes through the lower parts of the shells, so that the shells can pivot; furthermore, these parts have a construction in which opening and locking can be adjusted by a stowage lever part 14 on the upper end part. An opening-and-closing control part 15 that adjusts the opening-and-closing speed of the opening-and-closing part shell 12, and an open-lock pat 16 that prevents erroneous operation of the opening-and-closing part shell 12 when open, are disposed in the two shells.

As a result, since various types of objects of attachment can be built into the seat back in a replaceable manner, a multi-purpose stowage type seat which is superior in terms of safety, economy and convenience can be provided.

10 Claims, 17 Drawing Sheets

(A)

(B)

(A)

(B)

(A)

(B)

STORABLE SEAT

BACKGROUND OF THE INVENTION

1. Field of the Invention

The present invention relates to an automobile seat which has a stowage function, and more particularly relates to an stowage type seat which makes it possible to build a child seat or the like into a seat back in an interchangeable manner, and which is superior in terms of safety, economy and convenience.

2. Description of the Related Art

In recent years, the rate of increase in traffic accident fatalities involving children in passenger vehicles has reached a rate that is approximately quadruple the rate of increase in overall traffic accident fatalities in passenger vehicles, so that such fatalities involving children have shown an extremely abrupt increase. As a result of such a situation, the protection of children riding in automobiles from injury in traffic accidents has become an extremely urgent problem.

In light of such facts, the Roadway Traffic Law has been revised (Section 40 of the Law of Heisei 11 [1999]) so that the use of child auxiliary devices (hereafter referred to as "child seats") is now mandatory in cases where the driver of an automobile carries children younger than six years of age in an automobile. Consequently, the development of child seats has been accelerated.

Such child seats are ordinarily divided into three grades, i.e., infant use (used for children with a body weight of less than 10 kg, ranging in age from newborn infants to infants 1 year of age), small child use (used for children with a body weight of 9 to 18 kg, ranging in age from about 1 to 4 years) and school-age child use (used for children with a body weight of 15 to 36 kg, ranging in age from about 4 to 10 years), in accordance with the growth stage of the child. Furthermore, various modifications have been added to such child seats from the standpoints of child safety, convenience, comfort and the like.

One example of such a child seat will be described below. A stowable child seat 81 of the type shown in FIG. 24 is described in Japanese Patent Application Laid-Open No.2000-23856. Specifically, an opening-and-closing part 84 which is built into the seat back 82 of an automobile seat 80 beforehand, and which is connected to the main body of the seat back 82 via a connecting part 85 so that pivoting is possible is pulled out toward the seat cushion 83 at the time of use, and this opening-and-closing part 84 is stowed by being folded into the seat back 82 when not in use, so that the seat can be used as an ordinary seat 80. This invention aims to eliminate the trouble involved in the detachment of a child seat when not in use.

Furthermore, the structure shown in FIG. 25 is generally known as a child seat belt structure. Specifically, in this structure, a lap belt 93 which is attached so as to hold the portion of the body around the lap from the area between the seat back 91 and the seat cushion 92, and a pair of shoulder belts 94 which are attached so as to pass over both shoulders and hold the upper half of the body from the upper part of the seat back 91, are all connected by a buckle 95 attached to the crotch portion of the seat cushion 92. As a result of this construction, the body of the child is securely fastened to the child seat 90 at three points, i.e., shoulders, waist and crotch, so that safety can be improved; furthermore, in cases where the belt is to be released, since this can be accomplished merely by pressing a press button 96 attached to the buckle 95 without any need to release the plurality of belts one at a time, the trouble involved in the child getting into and out of the seat, and the trouble that must be taken by the guardian assisting in this, can be reduced.

Problems to Be Solved

As was described above, child seats are divided into three grades according to the growth stage of the child, and the changing of the seat to a seat the matches the body type of the child according to these grades is naturally necessary from the standpoint of child safety; it is not an exaggeration to say that this is the responsibility of the guardian. Considering such facts in the case of the stowable child seat 81 shown in FIG. 17, since this child seat 81 is built into the automobile beforehand, replacement of the child seat 81 together with the seat 80 or together with the automobile is necessary in order to change this child seat 81 to a seat of another grade. However, considering the rapidity of child growth, child seats 81 of the respective grades can generally only be used for one year at the least, or for five years at the most, replacement of the child seat together with the seat 80 results in a conspicuous loss of economy. Furthermore, when the child grows and reaches an age (six years or older) at which the child seat 81 is no longer needed, the child seat 81 built into the seat 80 becomes unnecessary, so that the function of the seat itself becomes useless.

Meanwhile, in the case of the belt structure of the general child seat 90 shown in FIG. 18, the press button 96 that releases the belt has a push type system that allows easy release in order to reduce the burden on the assisting person as described above; furthermore, this press button is disposed on the central portion of the buckle 95, which is within a range that can be reached by the hands of the child. Accordingly, there is a considerable possibility of release caused by the pressing of the button by the child itself out of general interest or resistance to the feeling of constraint caused by the belt, or release caused by the contact of foreign objects with the push button 96 in an emergency state such as sudden braking of the automobile, collision or the like.

Object of the Invention

The present invention was devised in order to solve the abovementioned problems encountered in the prior art; it is an object of the present invention to provide a stowage type seat which allows multi-purpose use by making it possible to build a child seat or the like into the seat back in a replaceable manner, an which is also superior in terms of safety, economy and convenience.

DISCLOSURE OF THE INVENTION

The present invention is a stowage type seat comprising a seat cushion which supports the hips of the passenger and a seat back which supports the back of the passenger, in which said seat back comprises a remaining-part shell, an opening-and-closing part shell which is constructed so that this opening-and-closing part shell can be opened and closed with respect to said remaining-part shell, and attachment parts that attach a plurality of different types of objects of stowage in a replaceable manner in said opening-and-closing part shell or remaining-part shell, or in both of these shells, wherein a child seat is included as one of said objects of stowage, chest part fastening parts which are used to fasten the chest part of the child to said child seat and leg part fastening parts which are used to fasten the leg parts of the child to said child seat are disposed on said child seat, chest part belts and leg part belts are respectively disposed on said chest part fastening parts and said leg part fastening parts, a lock receiving part and chest part sheaths that engage said chest part belts are disposed in said remaining-part shell separately from said attachment parts, a stowage lever part that engages with said lock receiving part and maintains the open state of said opening-and-closing part shell, leg part sheaths that engage with said leg part belts, and stowage buckles that engage with said chest part sheaths in the open state of said opening-and-closing part shell, are disposed in said opening-and-closing part shell separately from said attachment parts, said stowage lever part, said chest part sheaths and said leg part sheaths are connected by cables that pass through said remaining-part shell and the interior of said opening-and-closing part shell, and the system is constructed so that said chest part sheaths and said leg part sheaths can be simultaneously released by pulling the lever of said stowage lever part.

Preferably, this stowage type seat is constructed so that the abovementioned stowage lever part and the abovementioned chest part sheaths are connected by cables that pass through the abovementioned remaining-part shell and the abovementioned opening-and-closing part shell so that the chest part sheaths can be simultaneously released by the operation of the abovementioned stowage lever part.

In the present invention constructed as described above, since the stowage type seat comprises attachment parts corresponding to a plurality of types of objects of stowage, a child seat (for example) which constitutes one type of object of stowage can easily be replaced, attached and accommodated in accordance with the growth stage of the child in question; furthermore, even after the child in question no longer requires a child seat or the like, this seat can be used for various purposes as a stowage type seat.

DESCRIPTION OF THE PREFERRED EMBODIMENTS

An embodiment of the stowage type seat of the present invention will be concretely described with reference to FIGS. 1 through 16. Furthermore, in the present embodiment, the attachment parts referred to in the claims are attachment parts and attachment rails, and the objects of attachment include a child seat, baby seat, booster seat, cooler box and the like. Furthermore, the child seat, baby seat and booster seat (in that order) are respectively seats envisioning use for children (with a body weight of 9 to 18 kg, ranging in age from about 1 to 4 years), infants (with a body weight of less than 10 kg, ranging in age from newborns to about 1 year), and school-age children (with a body weight of 15 to 36 kg, ranging in age from about 4 to 10 years). However, in the present invention, the ages and body weights for which the seats are used are not limited to these concrete numerical values.

(1. Construction of Embodiment)

Figure 1:
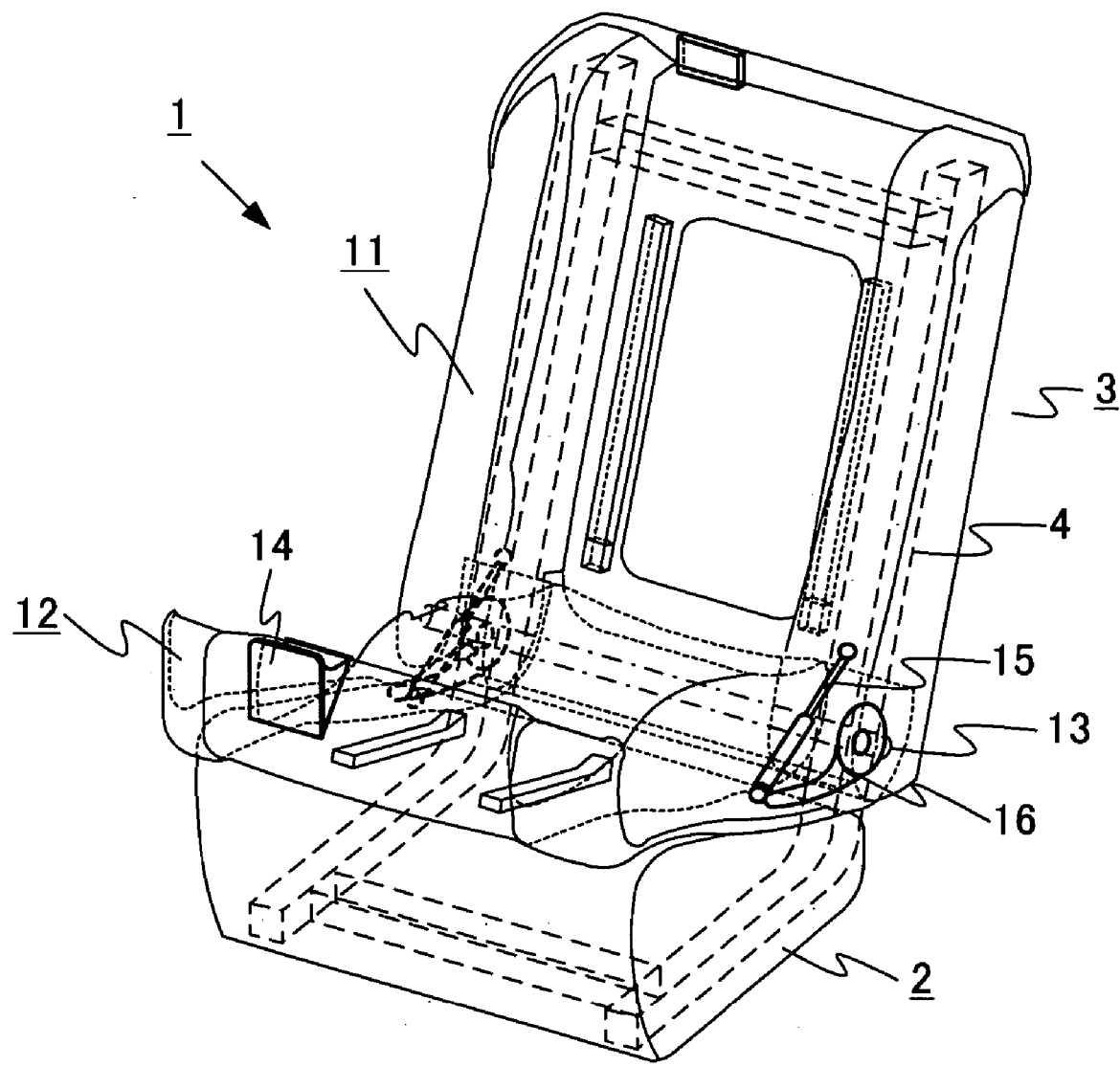
FIG. 1 is a perspective view which shows the overall construction of the stowage type seat in an embodiment of the present invention.
Figure 2:
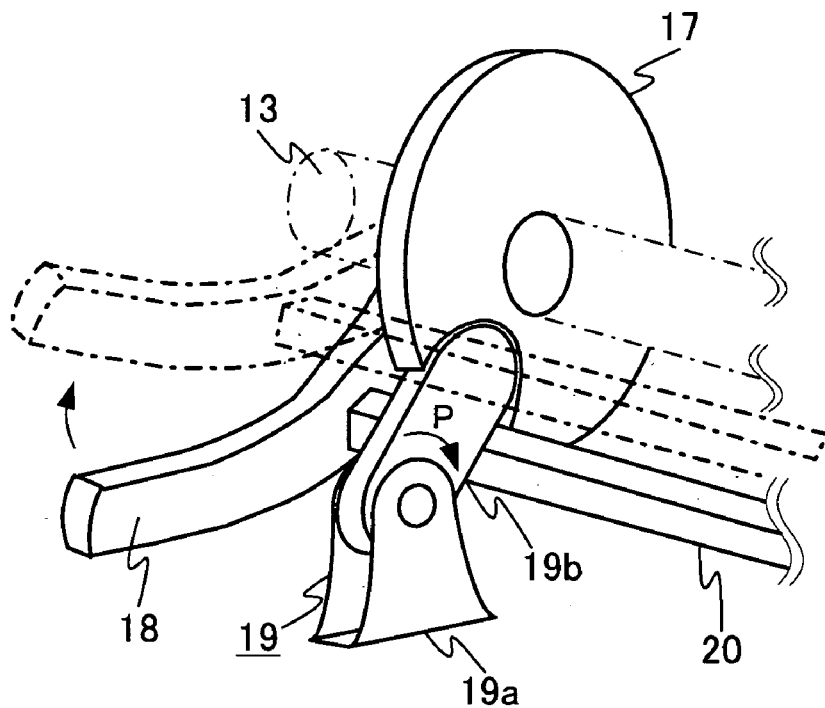
FIGS. 2A and 2B show, respectively, perspective view and a model diagram which illustrate the construction of the open-lock part in an embodiment of the present invention.
Figure 2:
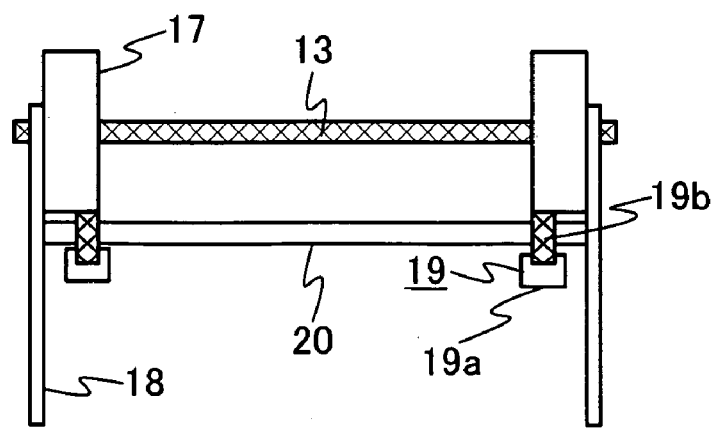

FIG. 1 is a perspective view which shows the open state of the stowage type seat 1 in the present embodiment.

(1-1. Overall Construction)

As is shown in FIG. 1, the stowage type seat 1 of the present embodiment is built into the left or right rear passenger seat of an automobile, or into both of these passenger seats (only the left rear passenger sear is shown here), and comprises a seat cushion 2 that supports the hips of the passenger, and a seat back 3 that supports the back of the passenger. Furthermore, a safety bone 4 that acts to absorb impact and ensure strength in the case of severe impacts from the rear is disposed on the back surface. The abovementioned seat back 3 comprises two members, i.e., a fixed remaining-part shell 11, and an opening-and-closing part shell 12 that opens and closes on the side of the seat cushion 2. Both of these members are connected via a connecting rod 13 that passes through the lower end portions of the members so that pivoting is possible; furthermore, the members are devised so that opening and locking can be adjusted by means of a stowage lever part 14 on the upper end portion. Furthermore, an opening-and-closing control part 15 which adjusts the opening-and-closing speed of the opening-and-closing shell part 12, and an open-lock part 16 which prevents erroneous operation of the opening-and-closing part shell 12 when open, are disposed on the left and right of the lower parts of both shells (with the open-lock part 16 being disposed further to the outside).

For example, the opening-and-closing control part 15 has a construction that can be extended and retracted by a fixed pressure, such as an air piston. As is shown in the perspective view (A) and model diagram (B) of FIG. 2, the open-lock part 16 comprises circular disks 17 each having a portion cut away in substantially a circular shape, a pair of handles 18, locking parts 19 disposed in the immediate vicinity of said circular disks 17, and a release part 20 which is attached parallel to the connecting part 13 between the inside surfaces of the handles 18. The connecting rod 13 passes through the centers of both the circular disks 17 and the handles 18. The former parts are attached to the opening-and-closing part shell 12 in a fixed manner so that these parts move in synchronization with the opening-and-closing action of the opening-and-closing part shell 12, while the latter parts perform a rotational action in two stages with respect to the connecting rod 13 as indicated by the one-dot chain line in the figures. Each of the locking parts 19 comprises a supporting part 19a which is fastened to the opening-and-closing part shell 12, and an oval locking bar 19b whose end portion engages with the cut-out part of the corresponding circular disk 17. Furthermore, the other end portion of the locking bar 19b is connected to the supporting part 19a so that this locking bar 19b can rotate, and the tip end portion of the locking bar 19b is constantly pushed toward the underside of the circular disk 17 (in the direction indicated by the arrow P) by a spring that is disposed inside.

When the opening-and-closing part shell 12 is open, the open-lock part 16 prevents the circular disks 17 to rotate by the engagement of the tip ends of the locking bars 19b with the cut-out parts of the circular disks 17; as a result, the opening-and-closing part shell 12 is fastened in an open state. On the other hand, when the opening-and-closing part shell 12 is to be stowed, the release part 20 pulls the tip ends of the locking bars 19b away from the circular disks 17 when the handles 18 are pulled up to the positions indicated by the abovementioned one-dot chain line; as a result, the fixed open state is released, so that the opening-and-closing part shell 12 can be stowed. Furthermore, when the handles 18 are in the positions indicated by the abovementioned one-dot chain line and the opening-and-closing part shell 12 is released during stowage, the handle 18 automatically move to the positions indicated by the solid line.

(1-2. Construction of Shells)

(1) Construction of Remaining-Part Shell

Figure 3:
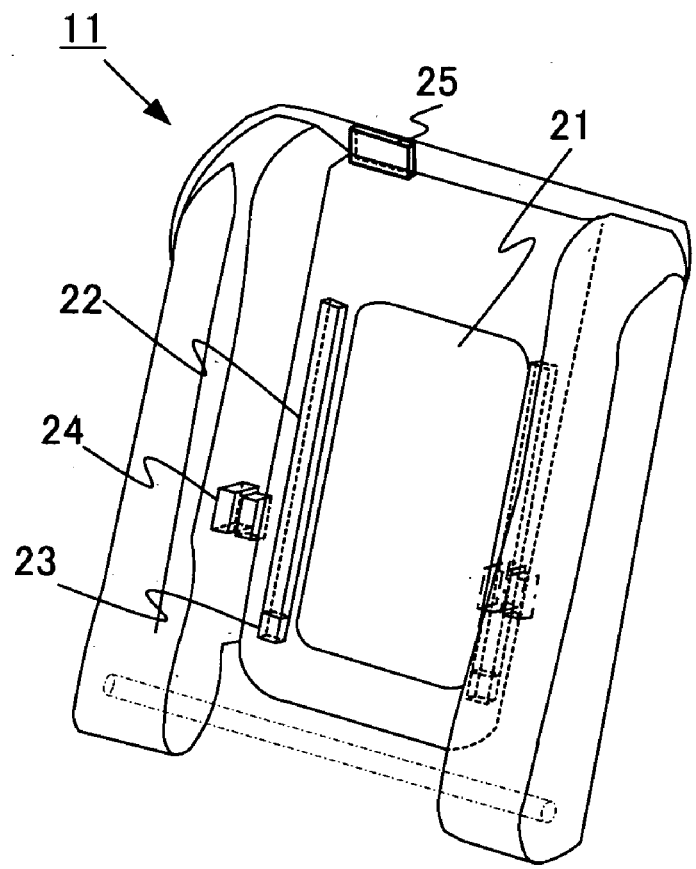
FIG. 3 shows a perspective view which illustrates the construction of the remaining-part shell in an embodiment of the present invention.
Figure 4:
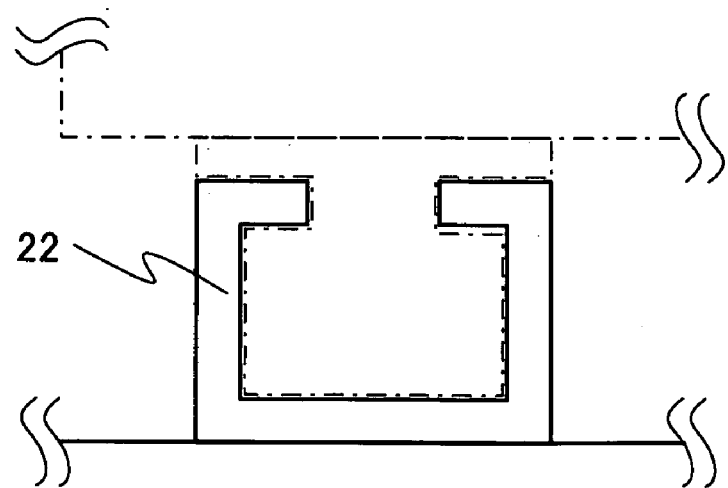
FIG. 4 is a sectional view which illustrates the construction of the attachment rail in an embodiment of the present invention.

As is shown in FIG. 3, the remaining-part shell 11 comprises an opening part 21 formed in the central portion, a pair of attachment rails 22 disposed along the left and right outer edges of the opening part 21, a pair of rail supporting holes 23 formed in the lower end portions of the attachment rails 22, chest part sheaths 24 disposed in the vicinity of the centers of the left and right end portions of the remaining-part shell 11, and a lock receiving part 25 disposed on the upper end portion.

The opening part 21 is a part which accommodates an object of attachment such as a cooler box or the like (described later); this opening part 21 communicates with the trunk or the like from the back surface of the stowage type seat 1. The shape of this opening part 21 is substantially rectangular, and the volume and the like can be freely set in accordance with the object of stowage (described later). The attachment rails 22 are formed from a rigid material, e.g., a metal such as iron, aluminum or the like. As is shown by the sectional view in FIG. 4, these rails are key-shaped in cross section, and the length of the attachment rails 22 in the longitudinal direction is substantially the same as the length of the opening part 21 in the longitudinal direction. The rail supporting holes 23 have a box shape in which the upper part is open; these holes are parts that receive the attachment rod insertion end portions of the object of attachment with their bottom surfaces, and that hold and fasten these end portions; the cross-sectional shape and material of these parts are the same as those of the abovementioned attachment rails 22. The lock receiving part 25 is a part which connects with the abovementioned stowage lever part 14, and which fastens the remaining-part shell 11 and opening-and-closing part shell 12. The chest part sheaths 24 are parts that mutually engage with the stowage buckles 30 and leg part belts 45 of the child seat 40 (described later).

(2) Construction of Opening-and-Closing Part Shell

Figure 5:
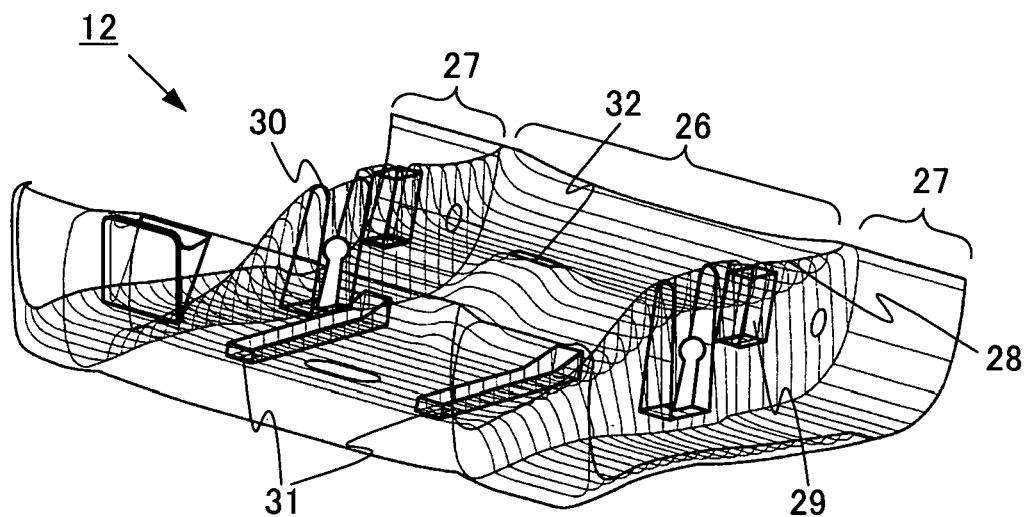
FIG. 5 is a perspective view which illustrates the construction of the opening-and-closing part shell in an embodiment of the present invention.

As is shown in FIG. 5, the opening-and-closing part shell 12 comprises a seat part 26 with a protruding center, and side surface parts 27 which are disposed on the left and right of the seat part 26; these parts are separated from each other by side walls 28. Furthermore, the abovementioned stowage lever part 14 is disposed on one portion of the tip end of the opening-and-closing part shell 12.

The seat part 26 is used "as is" as a seat for the child when during the use of the child seat (described later); accordingly, the center of this seat part 26 protrudes, and hollow are formed on the left and right of the front part, so that shifting of the hip parts and leg parts of the child is prevented. Furthermore, a pair of attachment parts 31 are disposed on the left and right in these hollows, and a leg belt hole 32 through which the leg belt parts 45 (described later) are passed is formed in the vicinity of the center of the central protruding part. Leg part sheaths 29 are disposed on the side walls 28 on left and right extension lines of the central protruding part, and stowage buckles 30 are disposed on the side walls 28 in front of the leg part sheaths 29. Like the abovementioned chest part sheaths 24, the leg part sheaths 29 are parts that connect with the leg part belts 45 during the use of the child seat. Furthermore, when the opening-and-closing part shell 12 is stowed, the stowage buckles 30 engage with the abovementioned chest part sheaths 24, and adjust the opening and locking of the remaining-part shell 11 and opening-and-closing part shell 12 together with the abovementioned stowage lever part 14.

Figure 6:
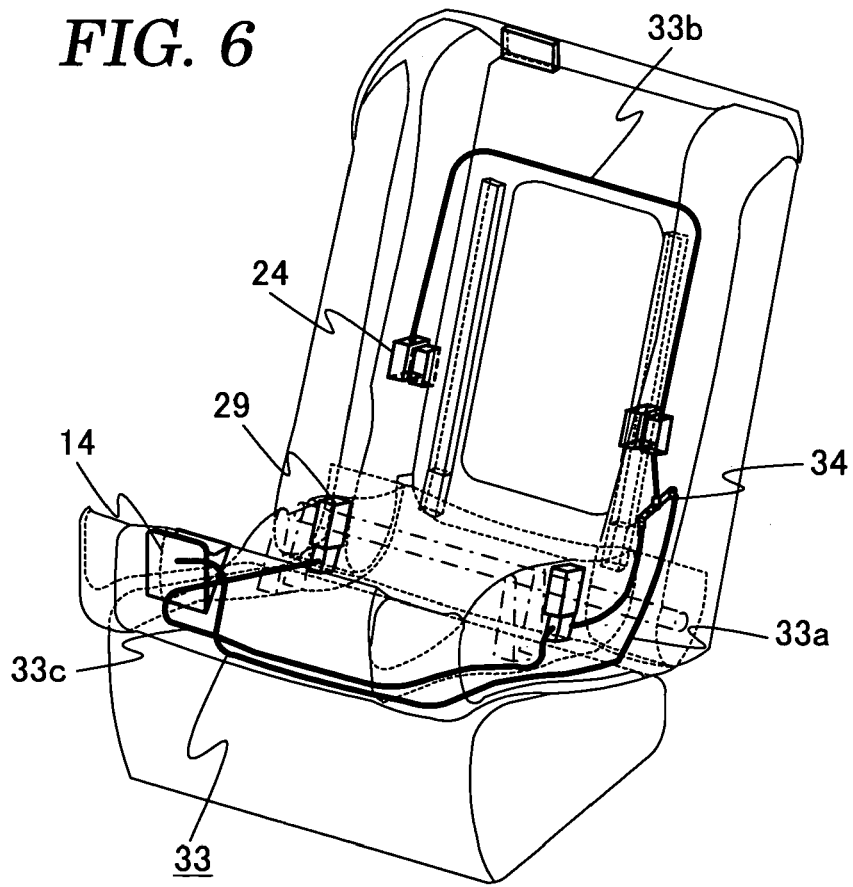
FIG. 6 is a perspective view which illustrates the construction of the remaining-part shell and the construction of the cable in the interior of the opening-and-closing part shell in an embodiment of the present invention.
Figure 7:
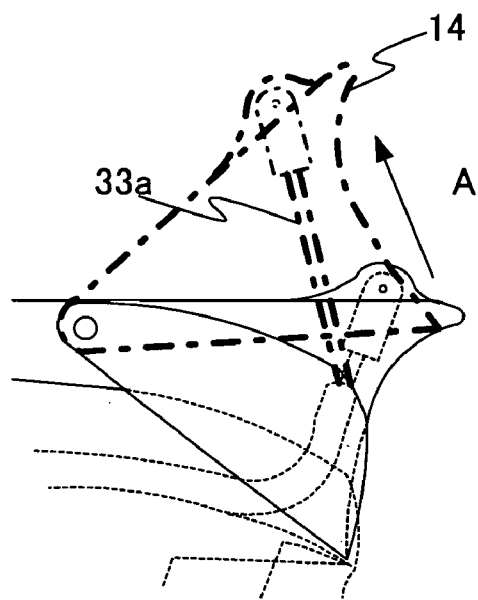
FIG. 7 is a model diagram which illustrates the construction of the stowage lever part in the remaining-part shell in an embodiment of the present invention.
Figure 8:
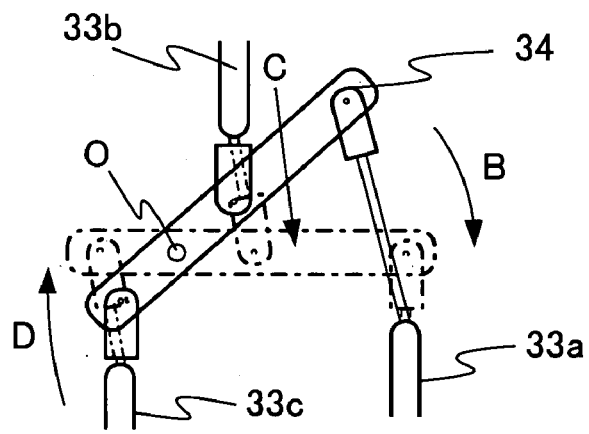
FIG. 8 is a model diagram which illustrates the construction of the remaining-part shell and the connecting part in the interior of the opening-and-closing part shell in an embodiment of the present invention.
Figure 9:
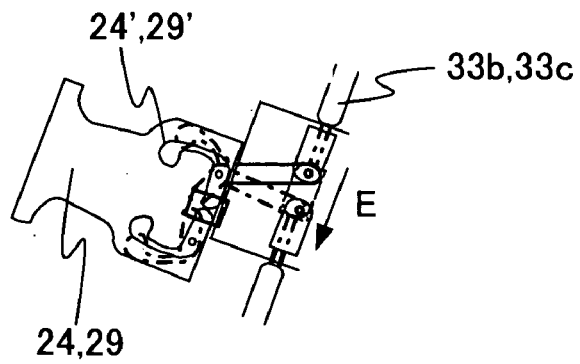
FIG. 9 is a model diagram which illustrates the construction of the chest part sheaths and the interior of the chest part sheaths in an embodiment of the present invention.

Here, as is shown in FIG. 6, cables 33 are routed inside the remaining-part shell 11 and opening-and-closing part shell 12. Specifically, a cable 33a is run from the stowage lever part 14 to the connecting part 34, a cable 33b is run from the connecting part 34 to the pair of chest part sheaths 24, and a cable 33c is similarly run from the connecting part 34 to the pair of leg part sheaths 29. These have the mechanisms described below. First, as is shown in FIG. 7, when the stowage lever part 14 is pulled in the direction indicated by the arrow A, so that the cable 33a attached to this stowage lever part 14 is pulled upward in the same direction, the connecting part 34 accordingly rotates in the direction indicated by the arrow B about the point O as shown in FIG. 8, and the cable 33b and cable 33c are respectively pulled in the directions indicated by the arrows C and D. Consequently, in the chest part sheaths 24 and leg part sheaths 29, as is shown in FIG. 9, the cables 33b and 33c that are passed through the back surfaces of the sheaths are respectively pulled in the direction indicated by the arrow E, so that the buckles 24' and 29' open to the left and right, and the lock is released. Specifically, when the stowage lever part 14 is pulled, the cables 33a, 33b and 33c are simultaneously pulled, so that the locking mechanisms of the chest part sheaths 24 and leg part sheaths 29 are all released at the same time.

Figure 10:
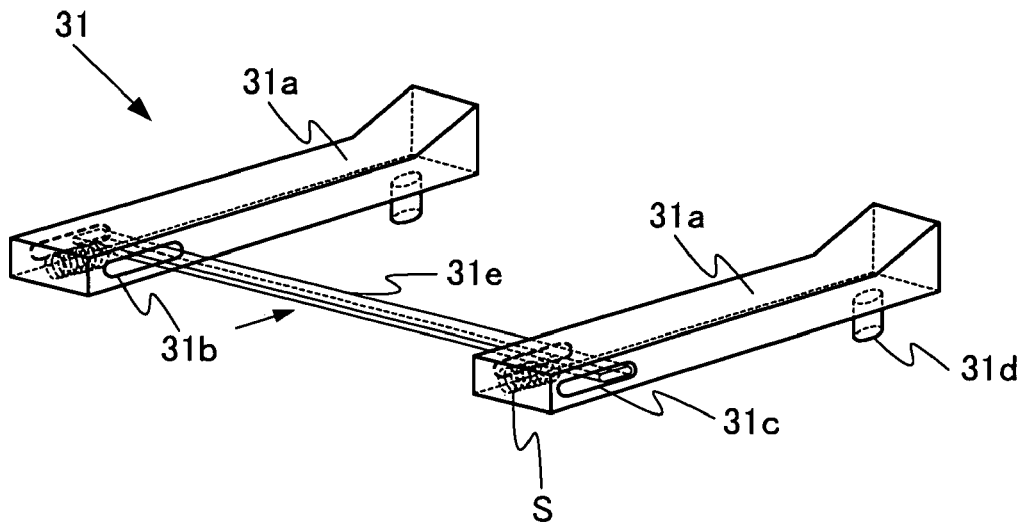
FIG. 10 is a perspective view which illustrates the construction of the attachment parts in an embodiment of the present invention.

As is shown in FIG. 5, the attachment parts 31 open in a rectangular shape in the left and right hollow portions of the seat part 26. As is shown in FIG. 10, these attachment parts 31 have a pair of opening parts 31a, oval inner holes 31b that communicate between both opening parts 31a in the inside surfaces of the tip ends, and outer holes 31c of the same shape in the outside surfaces. Furthermore, these attachment parts 31 have insertion holes 31d that open in a cylindrical shape in the rear ends. An oval engaging rod 31e is passed through these inner holes 31b, and both ends of this rod are supported by the outer holes 31c. This engaging rod 31e has substantially the same height as the inner holes 31b and outer holes 31c; however, the width of this rod is slightly smaller than the width of the holes. Accordingly, this rod can slide in the forward-rearward direction, but is constantly pushed rearward by the action of springs S from the forward direction.

(1-3. Construction of Objects of Attachment)

(1) Construction of Child Seat

Figure 11:
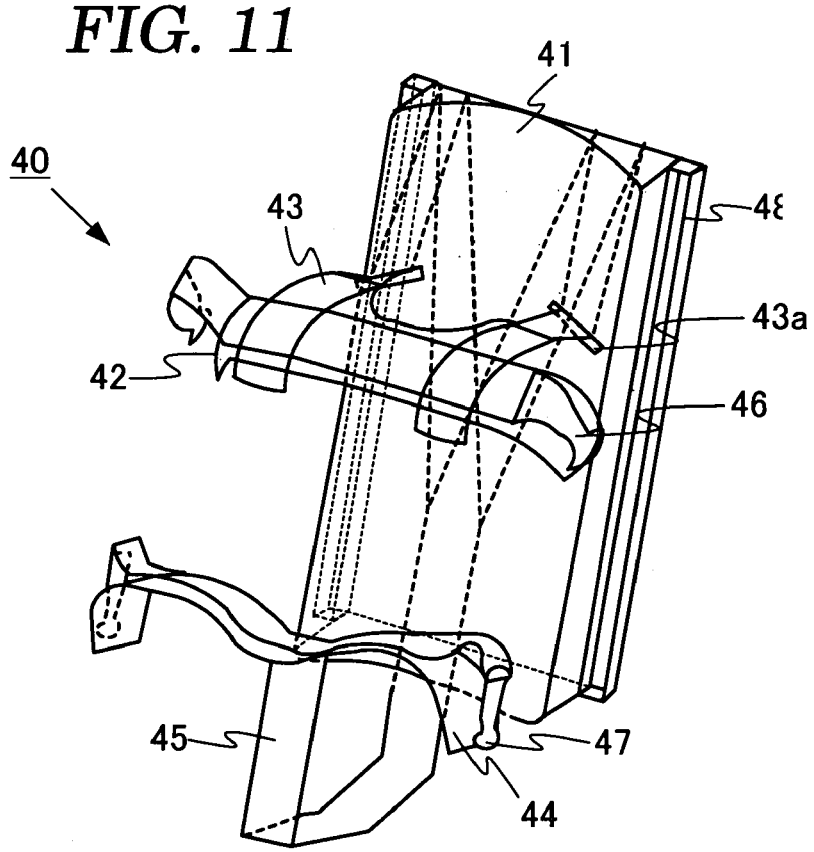
FIG. 11 is a perspective view which illustrates the construction of the child seat in an embodiment of the present invention.
Figure 12:
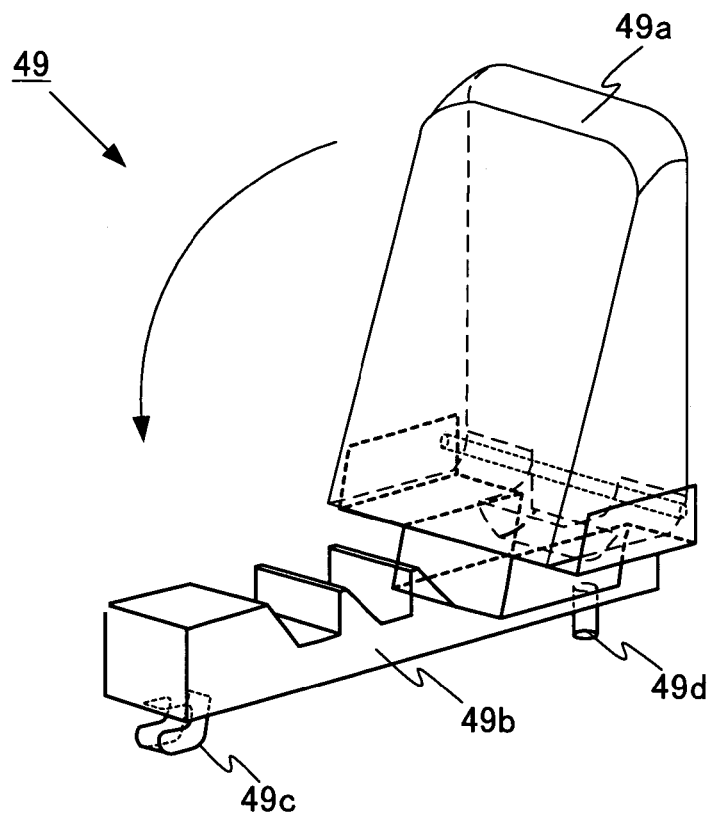
FIG. 12 is a perspective view which illustrates the construction of the footrest in an embodiment of the present invention.

The child seat 40 comprises a combination of a back rest part 41 and a foot rest 49 as shown in FIGS. 11 and 12. The back rest part 41 has a hollow formed in the shape of a mortar which is used to protect the upper body of the child so that this upper body is enveloped. A chest part fastening part 42 which has a pair of chest part belts 43 on the left and right, and a leg part fastening part 44 which has a leg part belt 45 in the lower central part, are disposed on the front surface. The abovementioned chest part belts 43 are passed through the back surface of the back rest part 41 via chest part belt holes 43a formed in two places in the upper part of the back rest part 41, while the leg part belt 45 is passed through the back surface of the back rest part 41 from the lower end portion, and these belts are all connected.

Figure 13:
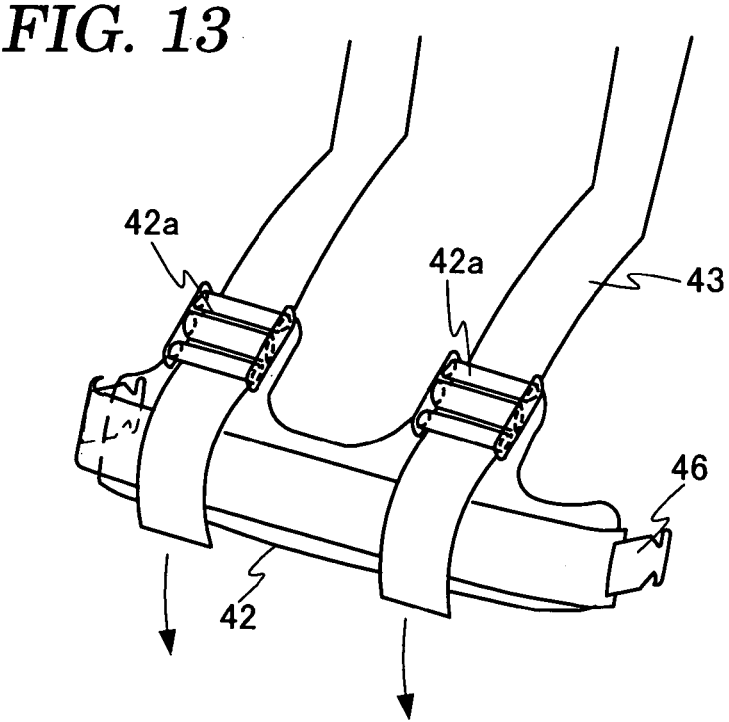
FIG. 13 is a perspective view which illustrates the construction of the chest part fastening parts of the child seat in an embodiment of the present invention.

Here, as is shown in FIG. 13, the chest part belts 43 and chest part fastening part 42 are connected by means of adjustment buckles 42a disposed on the chest part fastening part 42 so that the length of the belts can be adjusted. Accordingly, the length of the chest part belts 43 can be adjusted by moving the tip end portions of the chest part belts 43 passed through these adjustment buckles 42a in the direction indicated by the arrows in the figure; furthermore, the leg part belt 45 can also be adjusted by means of the abovementioned connecting function. Furthermore, the leg part belt 45 and leg part fastening part 44 are connected in a detachable manner by means of a surface fastener or the like. Moreover, pairs of buckles 46 and 47 that are engaged with the abovementioned chest part sheaths 24 and leg part sheaths 27 are disposed on the left and right end portions of the chest part fastening part 42 and leg part fastening part 44.

Figure 14:
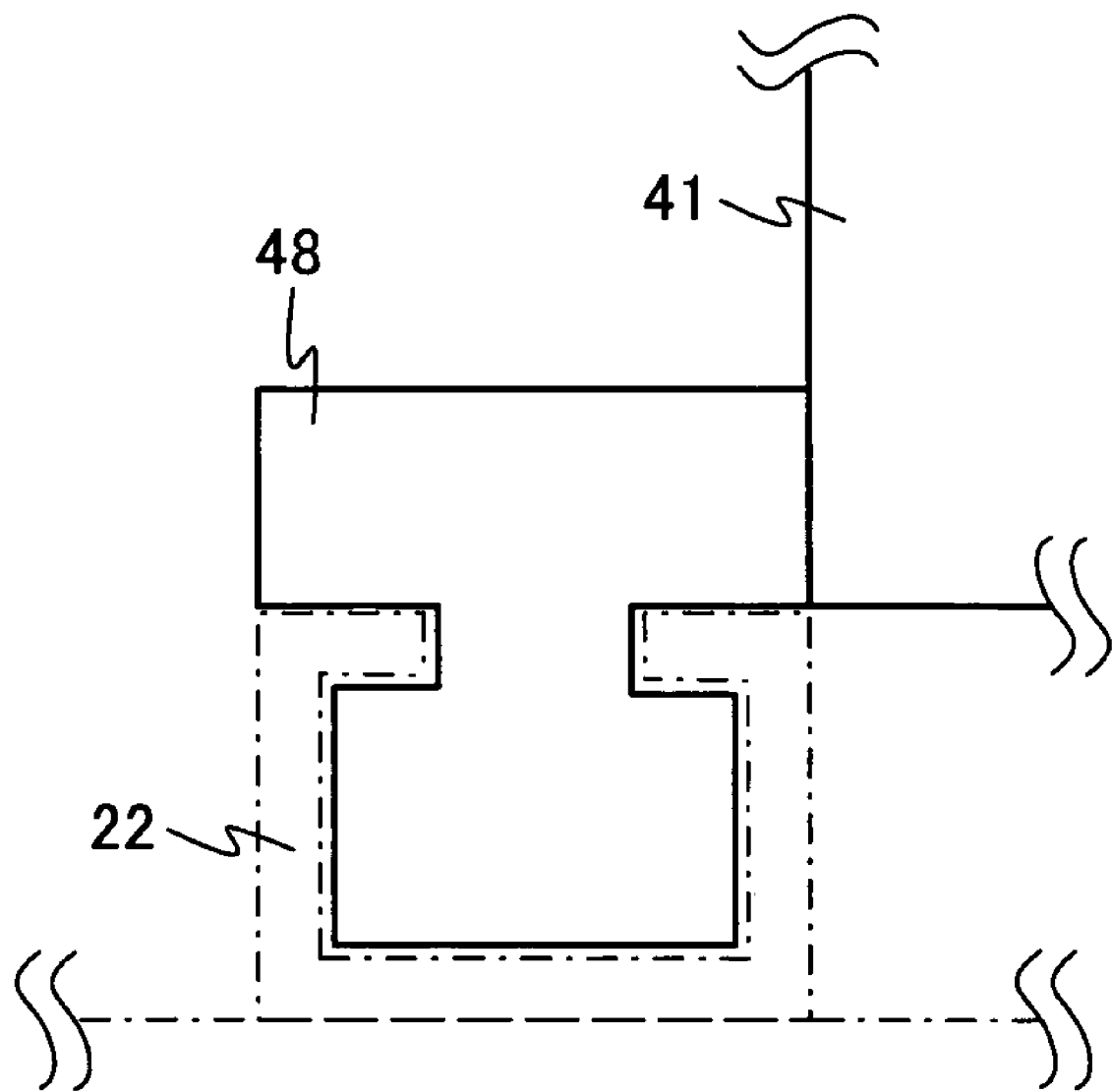
FIG. 14 is a sectional view which illustrates the construction of the attachment rods of the child seat in an embodiment of the present invention.
Figure 15:
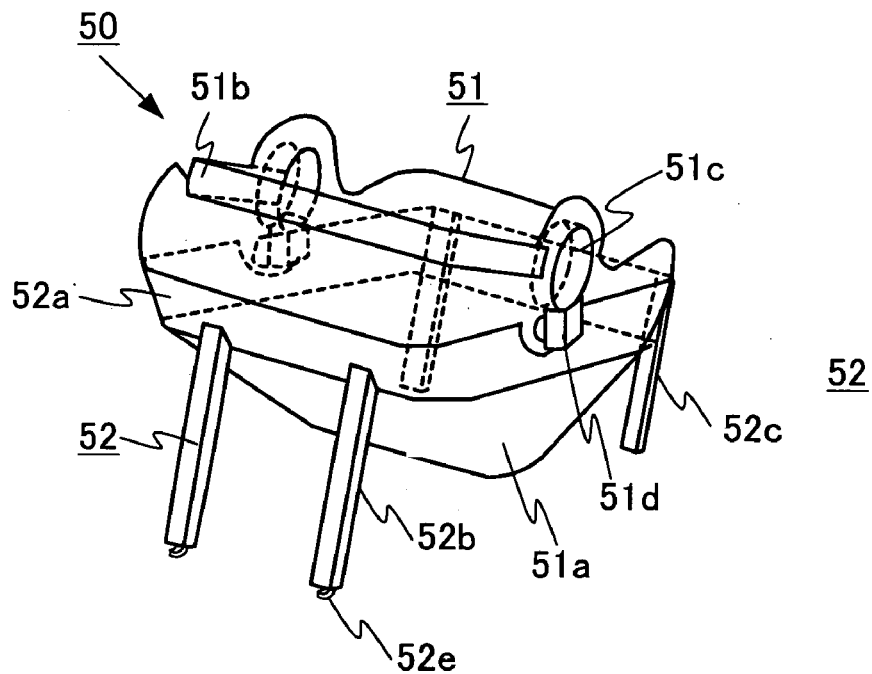
FIGS. 15A and 15B show, respectively, a perspective view and model diagram which illustrate the construction of the baby seat in an embodiment of the present invention.
Figure 15:
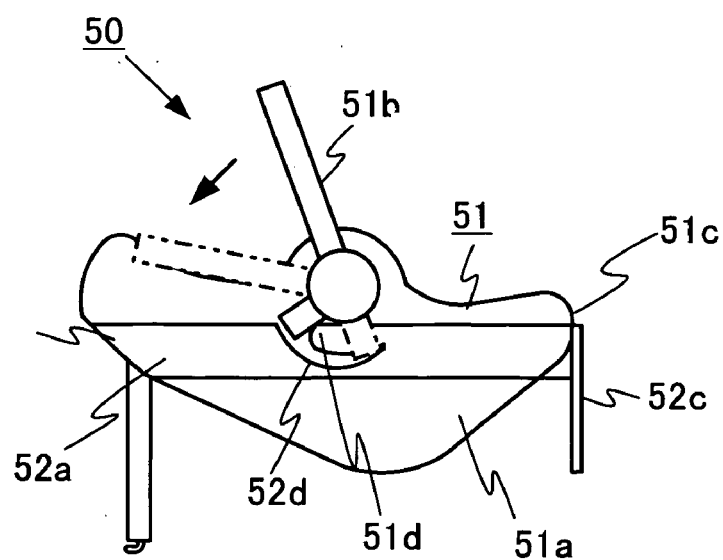

A pair of attachment rods 48 are disposed on the left and right on the back surface of the back rest 41. As is shown in FIG. 14, the cross-sectional shape of these attachment rods 48 is a rail-form shape which has indentations in the left and right central portions. Both the length and shape of these rods 48 are set so as to conform to the length and shape of the abovementioned attachment rails 22 (indicated by a dotted line in the figure).

As is shown in FIG. 12, the foot rest 49 is constructed as a pair of foot rests on the left and right (only one of these foot rests is shown in FIG. 12). Each of these foot rests comprises a foot rest part 49a on which the child places one of his feet, and a supporting part 49b which is connected and fastened to the corresponding attachment part 31 (see FIG. 5) of the opening-and-closing part shell 12. The shape of each of these foot rest parts 49a is long in the longitudinal direction, and the size of the surface may be any size sufficient to prevent the feet of the child from protruding, e.g., approximately 10 centimeters in the longitudinal direction and approximately 5 centimeters in the lateral direction. These foot rest parts 49a may be constructed from any material such as plastic, wood, metal or the like; however, the material used must be limited to a material that will not cause any harm to the body of the child, and it is desirable from the standpoints of convenience and safety that this material be a strong, light-weight material. The supporting parts 49b have substantially the same shape as the opening parts 31a of the abovementioned attachment parts 31; each of these supporting parts 49b has an engaging part 49c (on the lower part) which engages with the engaging rod 31e, and an insertion rod 49d which is inserted into the corresponding insertion hole 31d. Furthermore, the system is devised so that the positions of the foot rest parts 49a can be adjusted in several stages along the wave-form shape of the supporting parts 49b by turning the foot rest parts 49a over in the direction indicated by the arrow.

(2) Construction of Baby Seat

Figure 16:
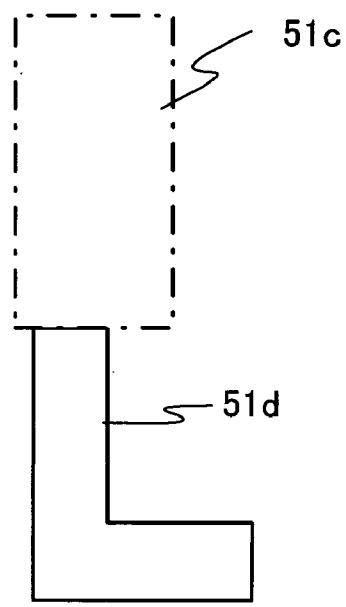
FIG. 16 is a model diagram which illustrates the construction of the fastening parts of the baby seat in an embodiment of the present invention.

As is shown by the perspective view in FIG. 15(A) and the model diagram in FIG. 15(B), the baby seat 50 comprises a basket member 51 which is used to carry the infant (with the infant lying on his back), and a supporting member 52 which sets the basket member 51 and fastens this basket member 51 to the remaining-part shell 11 and opening-and-closing part shell 12. The abovementioned basket member 51 comprises a basket 51a which is open at the top, and which has a substantially rectangular cross-sectional shape and a substantially triangular side cross-sectional shape, and an arm 51b which is attached to both end portions in the center of the upper part of the above-mentioned basket 51a via pivoting parts 51c so that this arm 51b can pivot. Furthermore, fastening parts 51*d* which fasten the basket member 51 to the supporting member 52 are disposed on the lower parts of the abovementioned pivoting parts 51*c*; as is shown in FIG. 16, the shape of these fastening parts 51*d* is such that the tip ends have a key-form shape. Meanwhile, the supporting member 52 has a rectangular shape, and comprises a supporting frame 52*a* which covers a portion of the lower part of the abovementioned basket member 51 along the inclination of this basket member 51, bottom part attachment rods 52*b* which are used to attach the supporting member 52 to the abovementioned attachment parts 31, and back part attachment rods 52*c* which engage with the attachment rails 22 of the remaining-part shell 11.

Engaging parts 52*e* which have a construction similar to that of the engaging parts 49*c* of the abovementioned foot rests 49 are disposed on the lower end portions of the bottom part attachment rods 52*b*, and these bottom part attachment rods 52*b* are attached to the engaging rod 31*e* of the attachment parts 31 (see FIG. 10) by the same method as that used for the foot rests 49. The back part attachment rods 52*c* also have a construction similar to that of the attachment rods 48 shown in FIG. 14.

Here, receiving parts 52*d* that receive the key portions of the fastening parts 51*d* are disposed on the left and right end portions of the supporting frame 52*a* with a shape in which the front end is open and the rear end gradually narrows along the range of operation of the fastening part 51*d*. Accordingly, in cases where the arm 51*b* is pushed over in the forward direction (into the position indicated by the two-dot chain line in the figure), the key portions of the fastening parts 51*d* engage with the rear ends of the receiving parts 52*d*, so that the basket member 51 is fastened to the supporting member 52. On the other hand, in cases where the arm 51*b* is lifted rearward (into the position indicated by the solid line in the figure), the fastening parts 51 are removed from the openings in the front ends of the receiving parts 52*d*, so that the basket member 51 can be removed from the supporting member 52.

(3) Construction of Booster Seat

Figure 17:
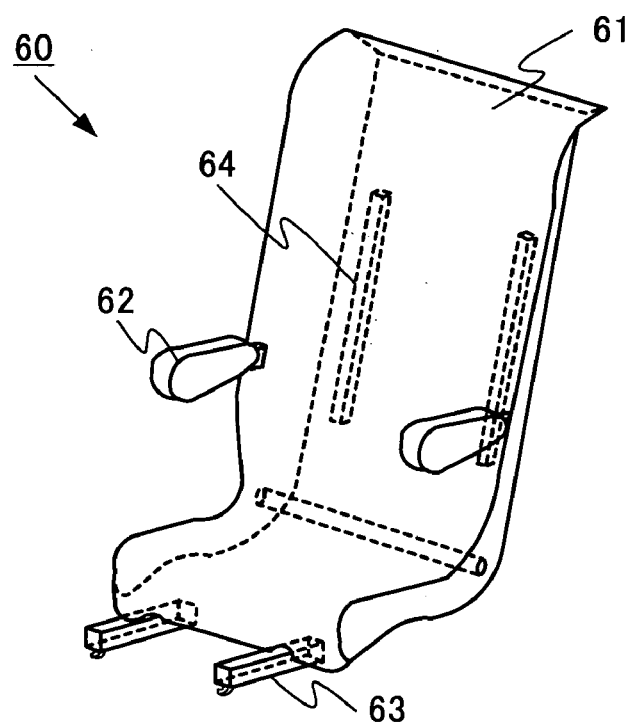
FIG. 17 is a perspective view which illustrates the construction of the booster seat in an embodiment of the present invention.

As is shown in FIG. 17, the booster seat 60 comprises a seat 61 which can be folded so that the back rest part and seat part are joined, foldable arm rests 62 disposed on the left and right sides of the back rest part, bottom part attachment parts 63 which are disposed on the front of the lower part, and back part attachment parts 64 which are disposed on the back surface of the back rest part. The abovementioned bottom part attachment parts 63 have a construction similar to that of the supporting parts 49*b* of the abovementioned foot rest 49 with the wave-form shape excluded; two of these bottom part attachment parts 63 are attached in a fixed manner to the lower front part of the seat 61. The back part attachment parts 64 have a construction similar to that of the attachment rods 48 shown in FIG. 14; two of these back part attachment parts 64 are attached on the left and right in positions coinciding with the attachment rails 22 of the remaining-part shell 11 (see FIG. 3).

(4) Construction of Cooler Box

Figure 18:
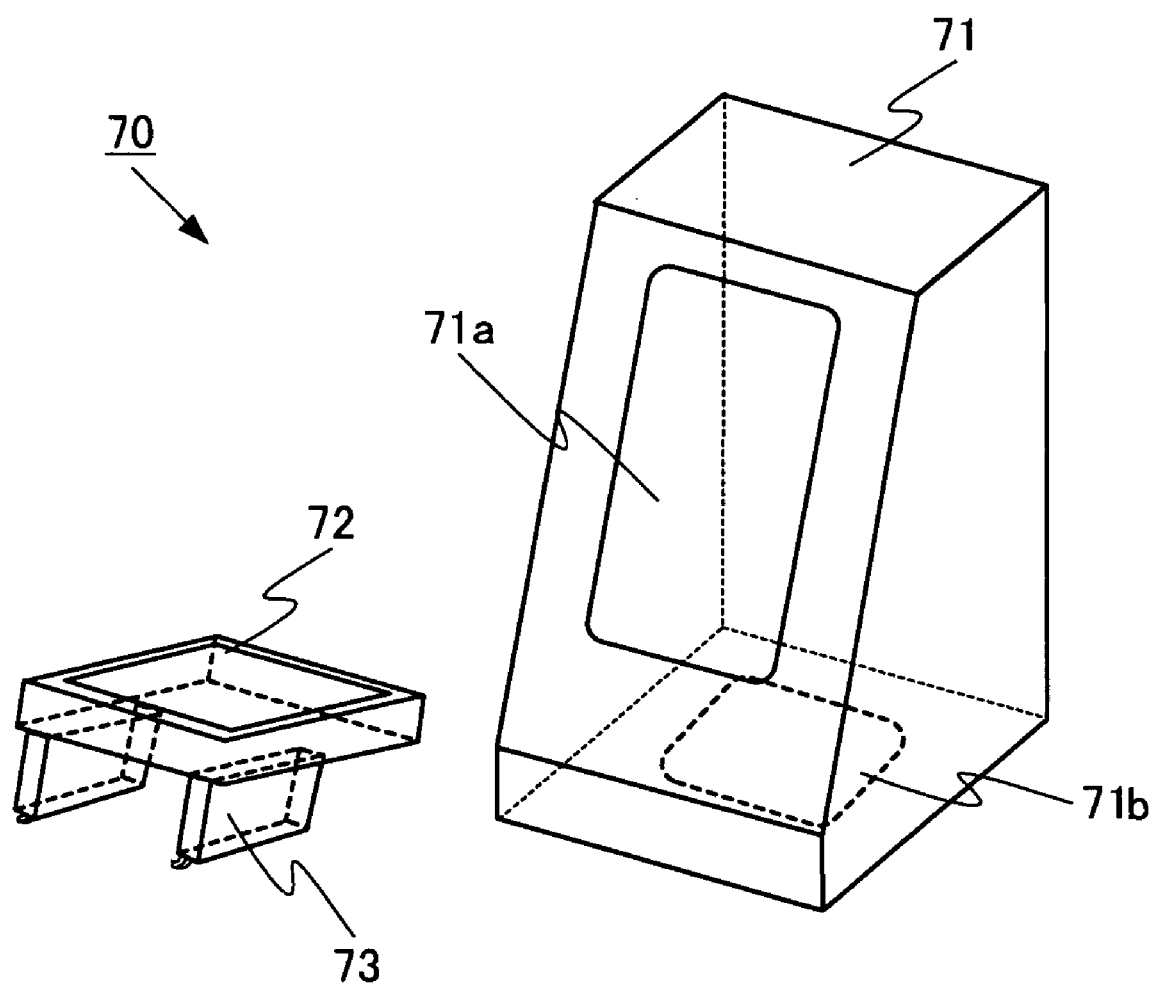
FIG. 18 is a perspective view which illustrates the construction of the cooler box in an embodiment of the present invention.

As is shown in FIG. 18, the cooler box 70 comprises a box part 71 which is disposed in the back surface trunk (not shown in the figures) of the remaining-part shell 11, and a cover part 72 which is disposed in the opening-and-closing part shell 12. The box part 71 has an opening 71*a* which has the same shape as the abovementioned opening part 21, and an exhaust port 71*b* in the bottom part. This exhaust port 71*b* communicates with the outside via a ventilation port in the bottom part of the trunk (not shown in the figures). The volume of the box part 71 can be altered in accordance with the size of the automobile seat and trunk in which the cooler box is disposed, and in accordance with the use intended by the user. The cover part 72 is formed so that this part is slightly larger than the abovementioned opening 71*a*, and rubber or the like is attached to the parts that contact the opening 71*a*, so that this cover part 72 can be tightly closed. Furthermore, bottom part attachment parts 73 similar to the bottom part attachment parts 63 of the abovementioned booster seat 60 are attached on the left and right to the surface of the cover part 72, so that the cover part 72 is fastened to the opening-and-closing part shell 12 by the function of these parts in the same manner as in the other constructions.

(2. Operation of the Embodiment)

The operation of the stowage type seat 1 in the embodiment constructed as described above will be described in terms of the individual operations according to each construction.

(1) Operation in the Case of Installation of the Child Seat

Figure 19:
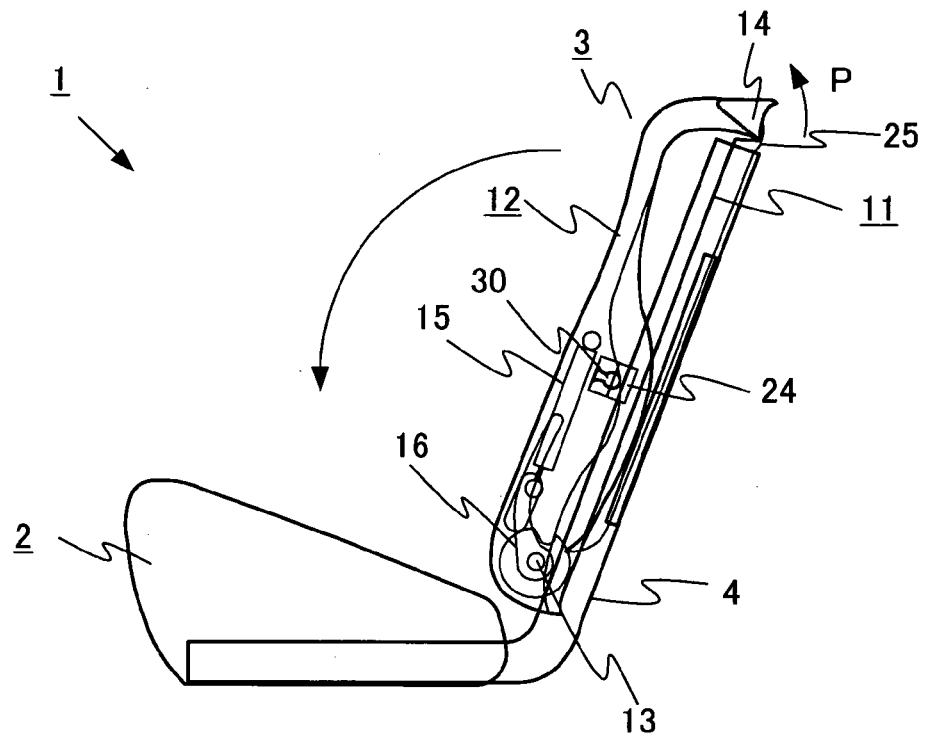
FIGS. 19A and B are model diagrams which illustrate the opening and closing operation of the stowage type seat in an embodiment of the present invention.
Figure 19:
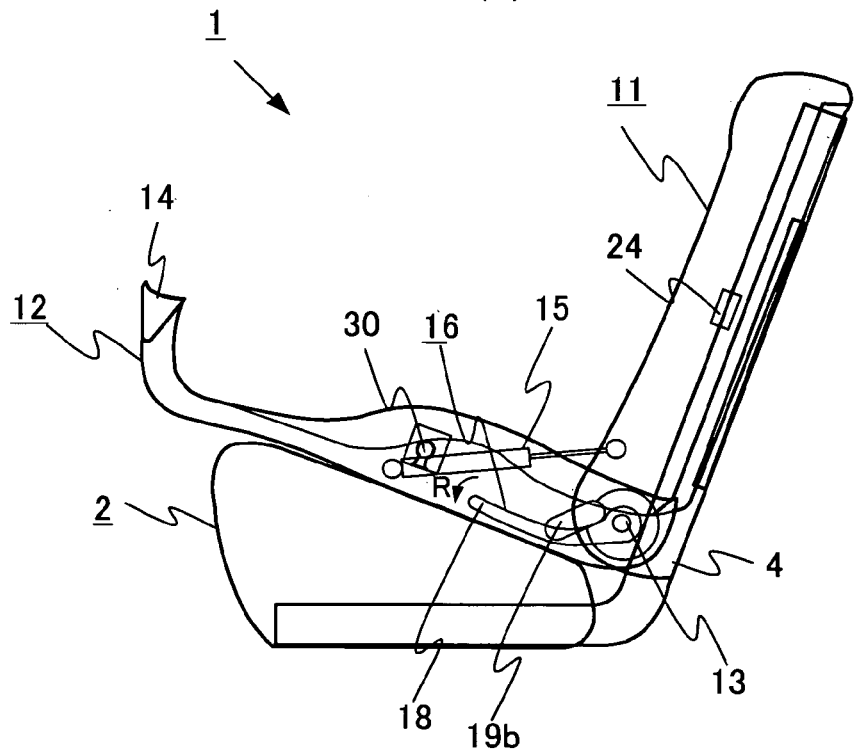
Figure 20:
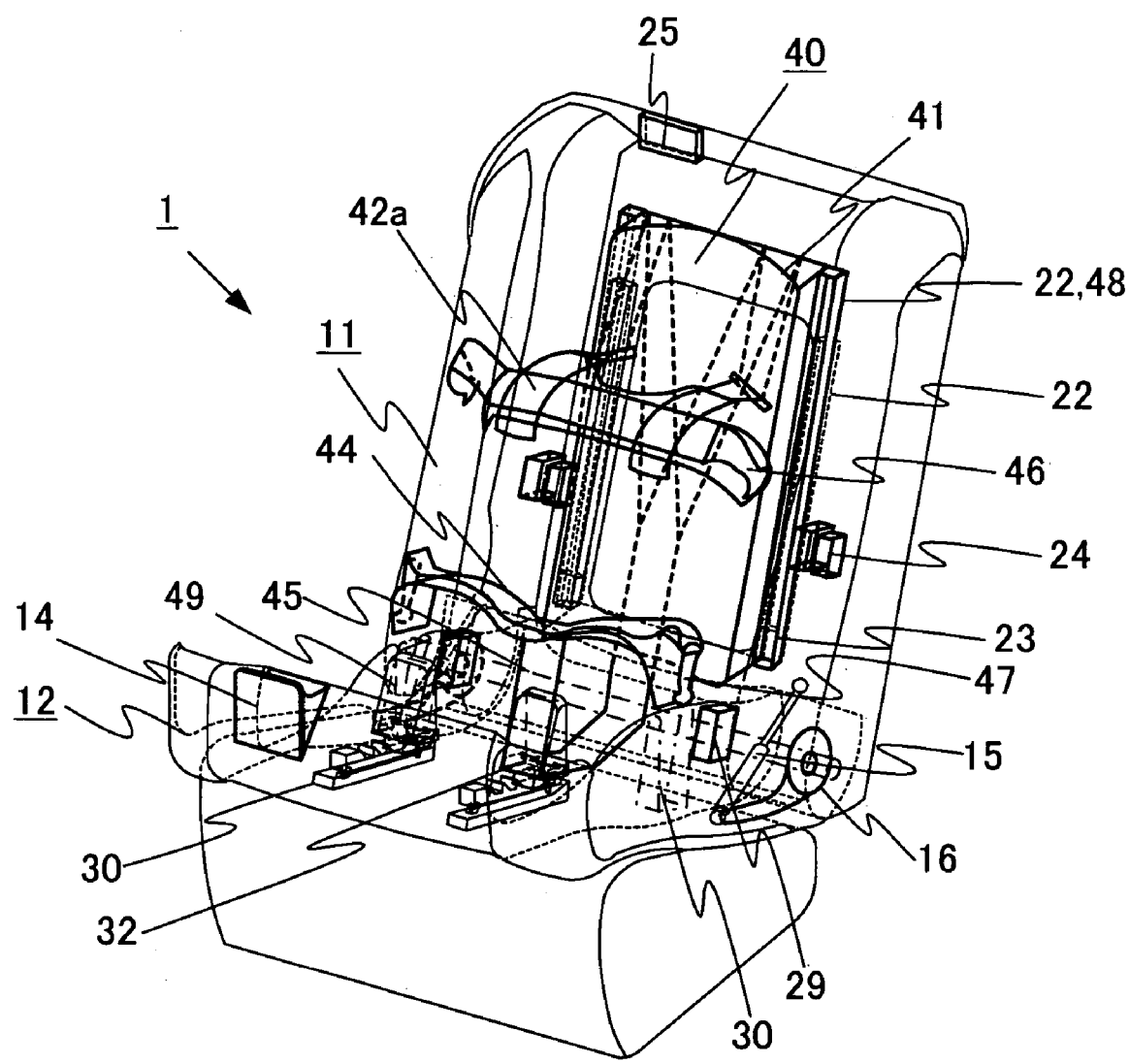
FIG. 20 is a perspective view which illustrates the operation of the stowage type seat in the case of child seat attachment in an embodiment of the present invention.

FIGS. 19(A) and (B) are model diagrams which respectively show the stowed state and open state of the stowage type seat 1, and FIG. 20 is a perspective view which shows how the child seat 40 is installed in the stowage type seat 1. In FIG. 19(A), when the stowage lever part 14 is pulled in the direction indicated by the arrow P from a state in which the stowage type seat 1 is closed, the stowage lever part 14 is removed from the lock receiving part 25; furthermore, as a result of the cable 33 (see FIG. 6) being pulled, the chest part sheaths 24 on the left and right of the remaining-part shell 11 are opened, so that the locking of the stowage buckles 30 is released. Consequently, the opening-and-closing part shell 12 opens at a constant speed while being controlled by the opening-and-closing control parts 15 on the left and right, with the connecting part 13 on the loser end portion of the seat back 4 as a supporting point. When the opening-and-closing part shell 12 opens until this shell contacts the seat cushion 2, the tip ends of the locking bars 19*b* of the open-lock part 16 engage with the circular disks 17 (see FIG. 2), so that the rotation of the circular disks 17 is checked, and the opening-and-closing part shell 12 is fastened in place, as shown in FIG. 19(B). Furthermore, in accordance with this operation, the handles 18 move in the direction indicated by the arrow R.

When the abovementioned opening operation is completed, the attachment rods 48 of the child seat 40 are attached facing downward to the attachment rails 22 of the remaining-part shell 11 as shown in FIG. 20. In this case, it is necessary to attach these attachment rods 48 firmly until the lower end portions of the attachment rods 48 reach the rail supporting holes 23. Furthermore, simultaneously with the abovementioned operation, the leg part belt 45 is pivoted toward the front surface from the back surface of the back rest part 41, and is at the same time pulled out to the front surface of the opening-and-closing part shell 12 from the rear part of the opening-and-closing part shell 12 via the leg part belt hole 32 (see FIGS. 5 and 11); moreover, the pulled-out leg part belt 45 and the leg part fastening part 44 are connected by a surface fastener.

After the disposition of the back rest part 41 is completed, the foot rests 49 are attached to the attachment parts 31; the conditions of this attachment will be described with reference to FIGS. 10 and 12. First, the engaging parts 49*c* of the supporting parts 49*b* are engaged with the engaging rod 31*e*, and the insertion rods 49*d* are inserted into the insertion holes 31*d* while the supporting parts 49*b* are pushed forward. Since the engaging rod 31e is constantly pushed rearward by a spring force as described above, the engaging parts 49c are pressed even after the insertion of the insertion rods 49d, so that the respective parts are firmly engaged, thus causing the supporting parts 49b to be fastened to the attachment parts 31.

Subsequently, the child is seated in the seat; in this case, it is necessary to seat the child as deeply as possible while taking care to ensure that the protruding part in the center of the seat part 26 and the leg part belt 45 are positioned exactly in the crotch position. Once the child has been seated, the leg part fastening part 44 is wrapped around the child's lap, and the buckles 47 on both ends are respectively inserted and connected to the leg part sheaths 29. Similarly, the chest part fastening part 42 is lowered over the child from the child's head to the vicinity of the chest part, and the buckles 46 on both ends are inserted and connected to the chest part sheaths 24. Here, in cases where the constraints created by chest part fastening part 42 and leg part fastening part 44 are too tight or too loose, both of these parts are simultaneously adjusted by means of the adjustment buckles 42a disposed on the chest part fastening part 42. Furthermore, the positions of the footrest parts 49a of the foot rests 49 that were attached beforehand are adjusted in accordance with the positions of the feet of the child. In this adjustment, it is desirable that these parts not be placed in positions in which the legs of the child are completely extended or positions that cannot be reached by the feet of the child, but instead be placed in positions with sufficient room so that the soles of the feet are completely disposed on the surfaces of the footrest parts 49a.

When the child is to be removed from the child seat 40, the stowage lever part 14 is first pulled forward. Consequently, the cable 33 passed through the shell interior parts (see FIG. 6) is pulled, so that the locks inside the chest part sheaths 24 and leg part sheaths 29 are simultaneously opened, and the constraints created by the chest part fastening part 42 and leg part fastening part 44 are released. Once the constraints of the respective fastening parts have been released, the respective shields are removed while taking care to avoid entanglement with the child's body, and the child is removed from the child seat 40.

In cases where the use of the child seat 40 is finished, and the child seat 40 is to be stowed, one of the open-lock pats 16 on the left and right side surface parts 27 of the opening-and-closing part shell 12 is pulled upward so that the release rod 20 pulls the locking bars 19b away from the circular disks 17 (see FIG. 2), thus releasing the locked state of the opening-and-closing part shell 12, so that an opening-and-closing operation is possible. Then, while being controlled by the opening-and-closing control parts 15, the opening-and-closing part shell 12 is raised and folded together with the remaining-part shell 11, and the stowage lever part 14 and lock receiving part 25, and stowage buckles 28 and chest part sheaths 24, are respectively connected and fastened, so that a stowed state is achieved. Furthermore, both fastening parts 42 and 44 and the like of the child seat 40 are accommodated in the space between the two shells.

(2) Operation in the Case of Installation of the Baby Seat

Figure 21:
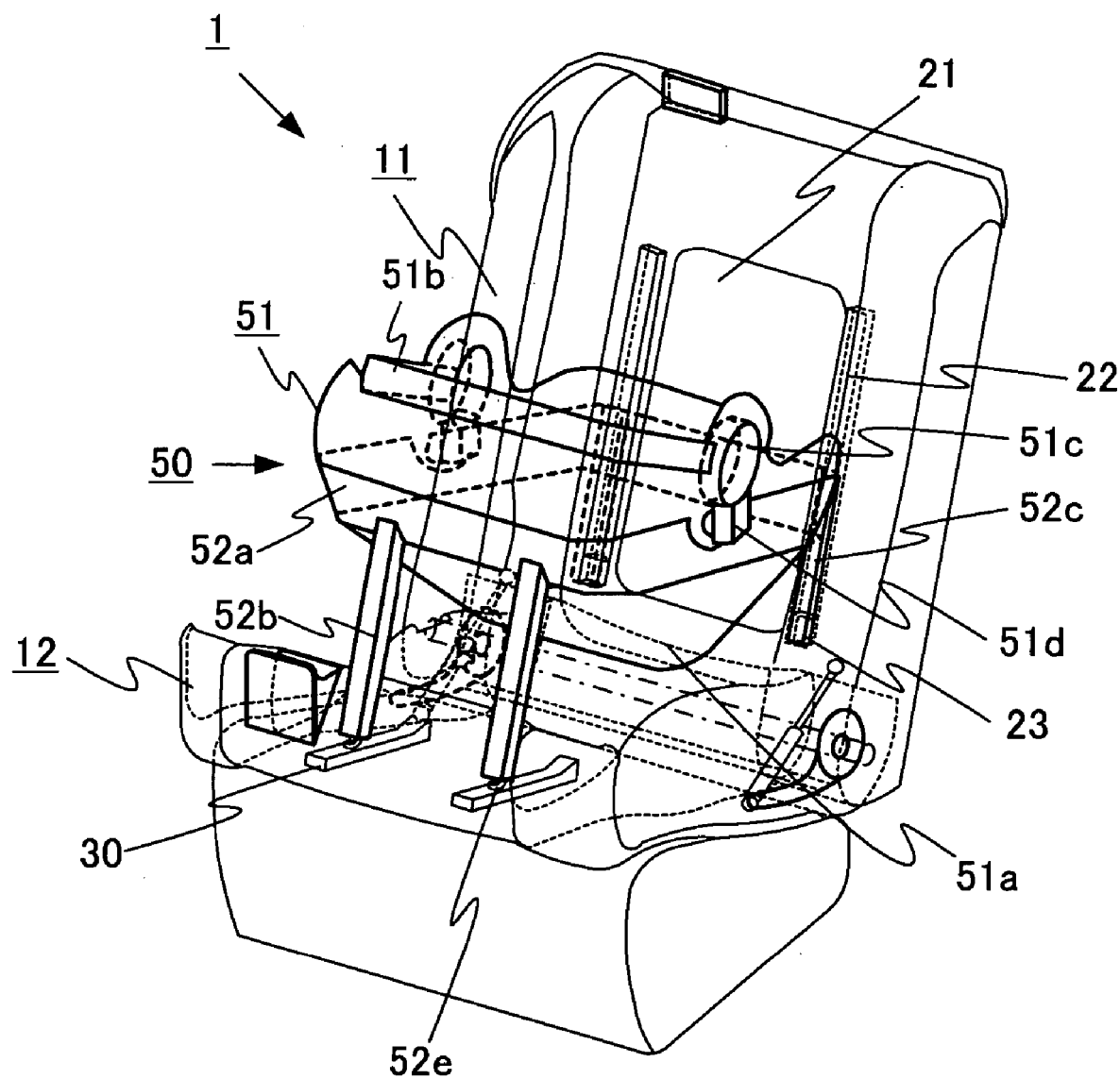
FIG. 21 is a perspective view which illustrates the operation of the stowage type seat in the case of baby seat attachment in an embodiment of the present invention.

FIG. 21 is a perspective view which shows how the baby seat 50 is installed in the stowage type seat 1. Furthermore, since the opening-and-closing operation of the stowage type seat 1 in this case is that same as the operation in the case of installation of the child seat 40, a description of this operation is omitted.

In the open state of the stowage type seat 1, as is shown in FIG. 21, the back part attachment rods 52c of the supporting member 52 are attached to the attachment rails 22 of the remaining-part shell 11 while being caused to slide from above. These back part attachment rods 52c are inserted until the inserted ends of the back part attachment rods 52c reach the rail supporting holes 23; similarly, the bottom part attachment rods 52b reach the attachment parts 30 of the opening-and-closing part shell 12. In this case, as in the case of the child seat 40, the engaging parts 52e on the lower ends of the bottom part attachment rods 52b are inserted while the engaging rods 29c are pushed forward, and the key-shaped portions of the engaging parts 52e engage with the engaging rods 29c. In this case as well, both parts are firmly fastened by the springs attached to the engaging rods 29c.

After the installation of the supporting member 52 has been completed, the basket member 51 is aligned with the supporting frame 52a, and the arm 51b is pushed over in the forward direction, so that the fastening parts 51d are engaged and fastened to the receiving parts 52d. In cases where the stowage type seat 1 is to placed in the stowed state, the basket member 51 is removed by an operation performed in the opposite order from that described above, and this stowage is accomplished by pulling the left and right open-lock parts 17 of the opening-and-closing part shell 12 and raising the opening-and-closing part shell in the same manner as in the case of the child seat 40. Furthermore, in the case of this operation, unlike the case of the child seat 40, the supporting member 52 is stowed inside the trunk via the opening part 21.

(3) Operation in the Case of Installation of the Booster Seat

Figure 22:
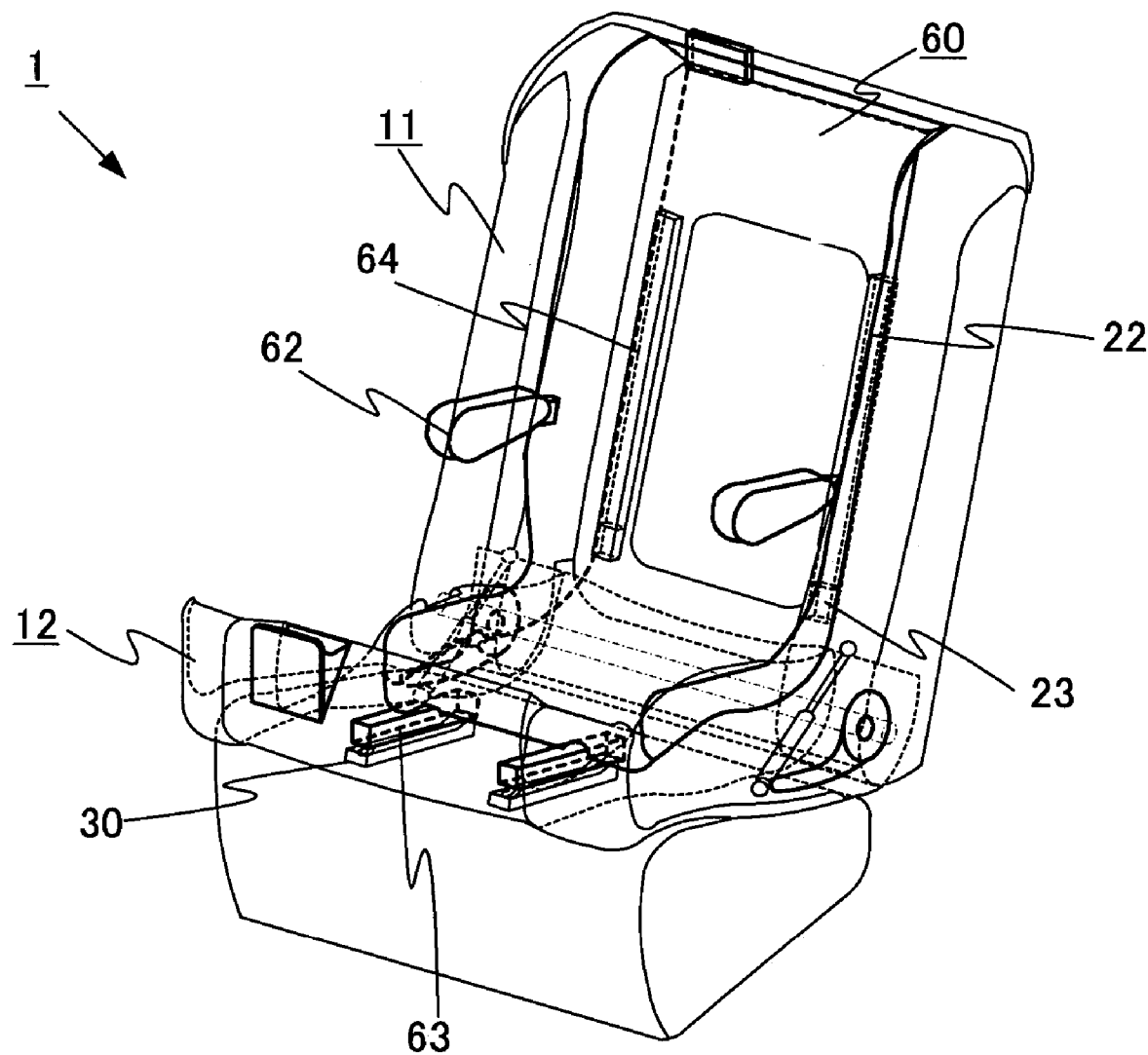
FIG. 22 is a perspective view which illustrates the operation of the stowage type seat in the case of booster seat attachment in an embodiment of the present invention.

FIG. 22 is a perspective view which shows how the booster seat 60 is installed in the stowage type seat 1. Furthermore, since the opening-and-closing operation of the stowage type seat 1 in this case is similar to the operation in the case of installation of the child seat 40, details of this operation are omitted.

In the open state of the stowage type seat 1, the back part attachment parts 64 disposed on the back surface of the back rest part of the seat 61 are attached to the attachment rails 22 while being caused to slide from above. These back part attachment parts 64 are attached until the inserted ends of the back part attachment parts 64 reach the rail supporting holes 28; similarly, the bottom part attachment parts 63 reach the attachment parts 30 of the opening-and-closing part shell 12. In this case, as in the cases of the child seat 40 and baby seat 50, the engaging parts on the lower ends of the bottom part attachment parts are inserted while the engaging rod 30e is pushed forward, and the key-form portions of the engaging parts are caused to engage with the engaging rod 30e. In this case as well, both parts are firmly fastened by the springs attached to the engaging rod 30e.

Once the installation work has been completed, the child is seated in the seat. In this case, the belts used are the seat belts used when the stowage type seat 1 is stowed (these-belts are not shown in the figures). Furthermore, when the booster seat 60 is to be stowed, the child is removed from the seat, the armrest parts 62 are folded to the side of the remaining-part shell 11, and an operation similar to the opening-and-closing operations of the child seat 40 and baby seat 50 is subsequently performed. Furthermore, since booster seat 60 is a folding type seat as described above, this seat is folded in accordance with the closing of the opening-and-closing part shell 12.

(4) Operation in the Case of Installation of the Cooler Box

Figure 23:
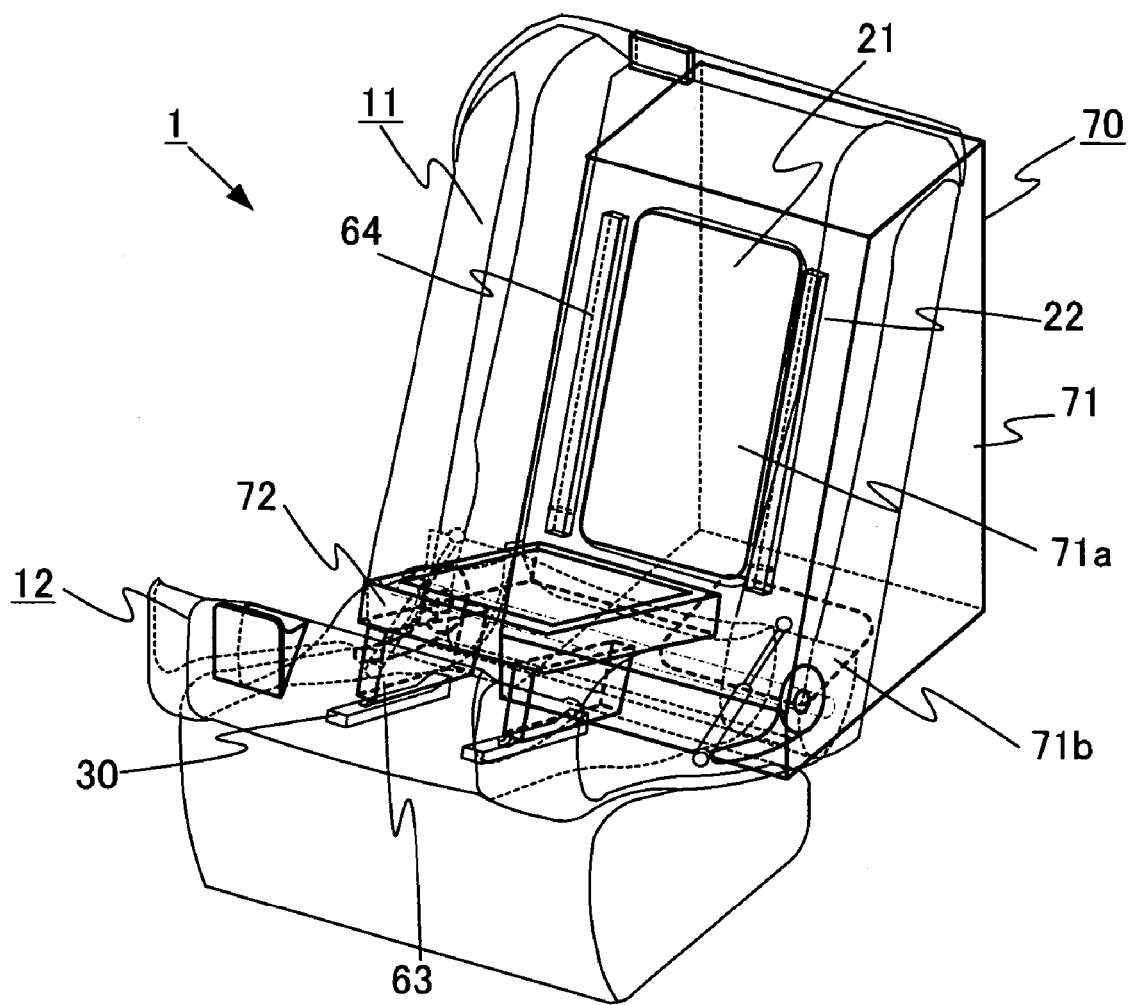
FIG. 23 is a perspective view which illustrates the operation of the stowage type seat in the case of cooler box attachment in an embodiment of the present invention.
Figure 24:
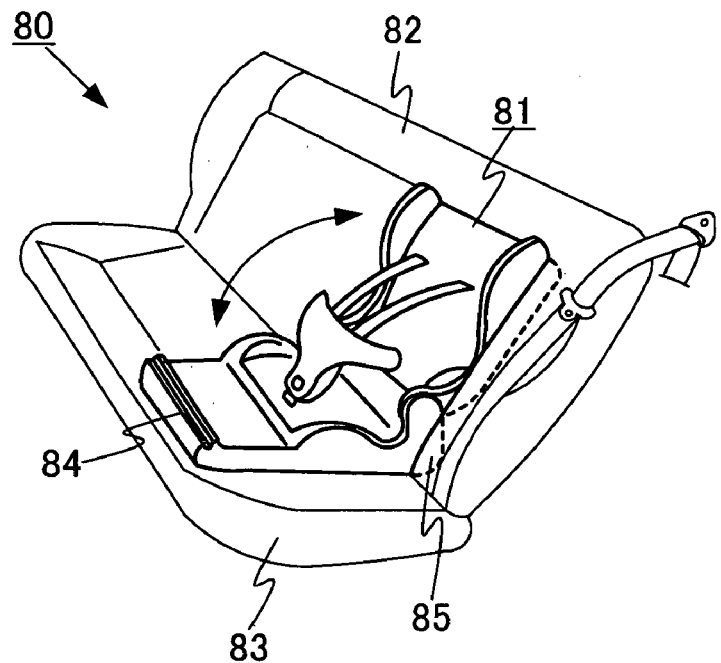
FIG. 24 is a perspective view which shows a stowable child seat in the prior art.
Figure 25:
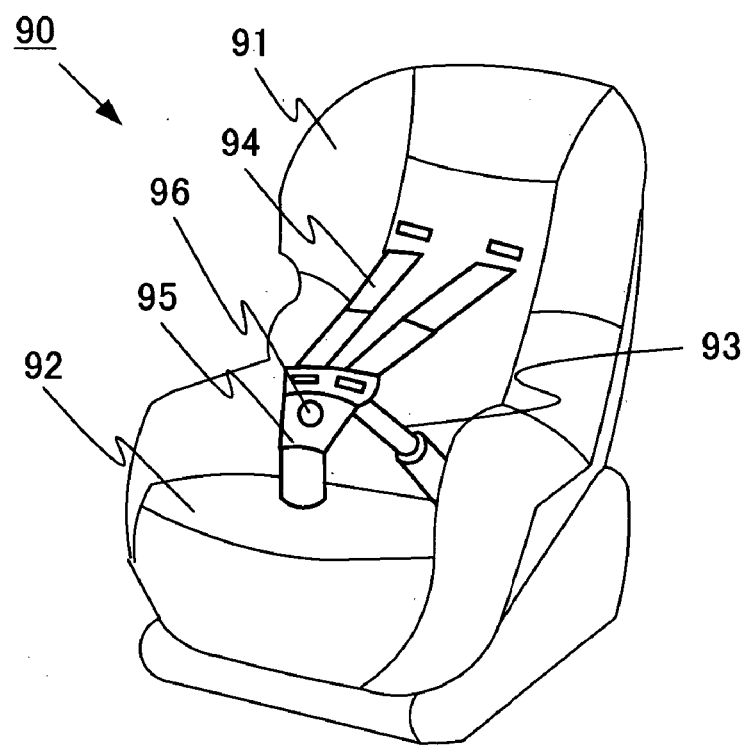
FIG. 25 is a perspective view which illustrates the construction of the child seat belts in the prior art.

FIG. 23 is a perspective view which shows how the cooler box 70 is installed in the stowage type seat 1. Furthermore, since the opening-and-closing operation of the stowage type seat 1 in this case is similar to the operation in the case of installation of the child seat 40, details of this operation are omitted.

First, the cooler box 71 is disposed facing the opening part 21 from the trunk (not shown in the figures) behind the stowage type seat 1. In this case, the opening 71a an exhaust port 71b of the box part must be respectively aligned with the opening part 21 of the remaining-part shell 11 and the ventilation port formed in the bottom part of the trunk. Next, the pair of bottom part attachment parts 73 fastened to the surface of the cover part 72 are attached to the attachment parts 30 of the opening-and-closing part shell 12. The manner of this attachment is similar to the case of the supporting parts 49b in the foot rests 49; accordingly, a description is omitted. Then, the cooler box 70 can be opened and closed by performing an opening-and-closing operation of the opening-and-closing part shell 12 using the same method as that used in the case of the child seat 40.

(3. Merits of the Embodiment)

In the present embodiment that was described above, the stowage type seat 1 possesses the following merits:

(1) Since the structures of the attachment rails 22 of the remaining-part shell 11 and the attachment parts 30 of the opening-and-closing part shell 12 have a common structure that can handle the attachment of a plurality of different objects, the stowage type seat 1 can not only accommodate a child seat 40, but also allows the stowage of various objects according to the intended use and purpose. Specifically, not only can seats be easily replaced, attached and accommodated in accordance with the growth stages of the child, but the stowage type seat can be used as a stowage type seat for various purposes even after the child no longer requires a child seat or the like. Accordingly, safety and convenience are conspicuously improved.

(2) In the case of stowage of the stowage type seat 1, the opening-and-closing part shell 12 can be locked to the remaining-part shell 11 in two places via the stowage lever part 14 and lock receiving part 25, and via the stowage buckles and chest part sheaths 24. Accordingly, for example, even in cases where a severe impact or the like caused by a collision or the like is applied, accidental opening or the like can be prevented, so that safety is ensured.

(3) Since the opening-and-closing speed of the opening-and-closing operation of the opening-and-closing part shell 12 can be adjusted by means of opening-and-closing control parts 15 dispose between the two shells, pinching of the hands or the like between the opening-and-closing part shell 12 and the seat cushion 2 or between the two shells as a result of abrupt opening and closing can be prevented.

(4) Since the pivoting of the opening-and-closing part shell 12 can be controlled by the open-lock part 16 when the opening-and-closing part shell 12 is open, the jumping upward or closing of the opening-and-closing part shell 12 due to swaying of the automobile in the vertical or left-right directions, or due to collisions or the like, can be prevented.

(5) Since the stowage lever part 14, chest part sheaths 24 and leg part sheaths 27 are connected by cables 33 inside the remaining-part shell 11 and opening-and-closing part shell 12, so that the locking of the chest part sheaths 24 and leg part sheaths 27 can be released merely by pulling the stowage lever part 14 alone, the release of the stowed state of the stowage type seat 1 and the release of the constraints of the chest part fastening part 42 and leg part fastening part 44 during the use of the child seat 40 can easily be accomplished. Accordingly, the work of seating or removing the child can be smoothly accomplished, so that the burden on the assisting person can be alleviated. Furthermore, since this stowage lever part 14 is disposed on the upper end portion of the opening-and-closing part shell 12 and has a lever type structure, release of the constraints by the child himself, or erroneous release in an emergency situation such as abrupt braking of the automobile, collisions or the like (as seen in the prior art), can be prevented, so that safety can be improved.

(6) In the child seat 40, the upper body and lower body of the child can be independently protected as a result of the child being fastened in place at two points above and below by the chest part fastening part 42 and leg part fastening part 44, so that safety is conspicuously improved; furthermore, both of these parts can be operated at one time by means of the adjustment buckles 42a, so that adjustment of the chest part fastening part 42, leg part fastening part 44 and the like can be performed easily and without any trouble. Furthermore, compared to cases in which both fastening parts are held in only one place as indicated in the prior art, the body of the child can be securely fastened in place, and individual differences and changes in the physique of the child can be handled.

(7) In the baby seat 50, the attachment and detachment of the basket member 51 to and from the supporting member 52 can be accomplished by the operation of the fastening parts 51d and receiving parts 52d accompanying the operation of the arm 51b, so that the basket member alone can be carried. Furthermore, for example, convenience can be conspicuously improved by installing a common structure that can be attached to a baby carriage.

(8) By forming an opening part 21 in a portion of the remaining-part shell 11, it is possible to install a cooler box that faces this opening part from the trunk, and this cooler box can be utilized from the interior of the vehicle by opening and closing the opening-and-closing part shell 12. This means that the function of the stowage type seat 1 is not wasted, but can be utilized in other applications even after the child grows so that a child seat 40 or the like is no longer needed. Thus, the economy and convenience of the stowage type seat 1 can be improved.

(4. Other Embodiments)

The present invention is not limited to the embodiment described above. For example, the following embodiments are also included in the present invention. Specifically, in addition to the abovementioned operations, various methods of utilization corresponding to other applications and purposes can be provided, e.g., the stowage type seat 1 can be utilized as a stowage location for (e.g.) umbrellas in rainy weather by forming the seat part 26 of the opening-and-closing part shell 12 with a waterproof structure, or disposing a waterproof member that covers the indentations and projections of the seat part 26, so that this is connected with the opening part 21 that communicates with the trunk; alternatively, the stowage type seat 1 can similarly be used as a space for storing wet items such as fresh seafood products, bottle beverages or the like.

INDUSTRIAL APPLICABILITY

As was described above, the present invention, by making it possible to build a child seat or the like into the seat back in a replaceable manner, makes it possible to provide a stowage type seat which can be used in various applications, and which is superior in terms of safety, economy and convenience.

What is claimed is:

1. A stowage type seat comprising a seat cushion which supports the hip of a passenger and a seat back which supports the back of the passenger, in which said seat back has a remaining-part shell, an opening-and-closing part shell which is constructed so as to be opened and closed with respect to said remaining-part shell, and attachment parts that attach a plurality of different types of objects of stowage in an interchangeable manner in at least one of said opening-and-closing part shell and remaining-part shell, wherein a child seat is included as one of said objects of stowage, chest part fastening parts which are used to fasten the chest part of a child to said child seat and leg part fastening parts which are used to fasten the leg parts of the child to said child seat are disposed on said child seat, chest part belts and leg part belts are respectively disposed on said chest part fastening parts and said leg part fastening parts, a lock receiving part and chest part sheaths that engage said chest part belts are disposed in said remaining-part shell separately from said attachment parts, a stowage lever part that engages with said lock receiving part and maintains the closed state of said opening-and-closing part shell, leg part sheaths that engage with said leg part belts, and stowage buckles that engage with said chest part sheaths in the closed state of said opening-and-closing part shell, are disposed in said opening-and-closing part shell separately from said attachment parts, said stowage lever part, said chest part sheaths and said leg part sheaths are connected by cables that pass through an interior of said remaining-part shell and said opening-and-closing part shell, and said chest part sheaths and said leg part sheaths can be simultaneously released by pulling the lever of said stowage lever part.

2. The stowage type seat according to claim 1, wherein an opening-and-closing control part is disposed between said remaining-part shell and opening-and-closing part shell.

3. The stowage type seat according to claim 2, wherein at least one part of said opening-and-closing part shell is waterproofed.

4. The stowage type seat according to claim 2, wherein an open-lock part that maintains the open state of said opening-and-closing part shell is disposed in said opening-and-closing part shell.

5. The stowage type seat according to claim 2, wherein an opening part is formed in said remaining-part shell so as to communicate with a trunk behind the stowage type seat.

6. The stowage type seat according to claim 1, wherein an open-lock part that maintains the open state of said opening-and-closing part shell is disposed in said opening-and-closing part shell.

7. The stowage type seat according to claim 6, wherein an opening part is formed in said remaining-part shell so as to communicate with a trunk behind the stowage type seat.

8. The stowage type seat according to claim 6, wherein at least one part of said opening-and-closing part shell is waterproofed.

9. The stowage type seat according to claim 1, wherein an opening part is formed in said remaining-part shell so as to communicate with a trunk behind the stowage type seat.

10. The stowage type seat according to claim 9, wherein at least one part of said opening-and-closing part shell is waterproofed.

* * * * *